United States Patent
Yeh

(10) Patent No.: US 9,649,814 B2
(45) Date of Patent: May 16, 2017

(54) 3D SCANNING-PRINTING DEVICE

(71) Applicant: DELTA ELECTRONICS, INC., Kuei San, Taoyuan Hsien (TW)

(72) Inventor: Hsin-Tsung Yeh, Taoyuan Hsien (TW)

(73) Assignee: DELTA ELECTRONICS, INC., Taoyuan Hsien (TW)

( * ) Notice: Subject to any disclaimer, the term of this patent is extended or adjusted under 35 U.S.C. 154(b) by 268 days.

(21) Appl. No.: 14/553,199

(22) Filed: Nov. 25, 2014

(65) Prior Publication Data

US 2015/0298395 A1 Oct. 22, 2015

Related U.S. Application Data

(60) Provisional application No. 61/981,613, filed on Apr. 18, 2014.

(51) Int. Cl.
| | |
|---|---|
| *G06F 19/00* | (2011.01) |
| *B29C 67/00* | (2017.01) |
| *B33Y 50/02* | (2015.01) |
| *B33Y 10/00* | (2015.01) |
| *B33Y 30/00* | (2015.01) |

(52) U.S. Cl.
CPC ........ *B29C 67/0088* (2013.01); *B29C 67/007* (2013.01); *B33Y 10/00* (2014.12); *B33Y 30/00* (2014.12); *B33Y 50/02* (2014.12)

(58) Field of Classification Search
USPC ................................................. 700/119, 120
See application file for complete search history.

(56) References Cited

U.S. PATENT DOCUMENTS

| | | | |
|---|---|---|---|
| 5,460,758 A | 10/1995 | Langer | |
| 8,636,496 B2 | 1/2014 | Das et al. | |
| 8,730,309 B2* | 5/2014 | Wilson | H04N 13/0275 348/51 |
| 9,169,968 B2* | 10/2015 | Pettis | F16M 13/022 |
| 9,364,995 B2* | 6/2016 | Roberts, IV | B29C 67/0088 |
| 2003/0003179 A1 | 1/2003 | Farnworth et al. | |
| 2012/0294510 A1* | 11/2012 | Zhang | G06K 9/2036 382/154 |
| 2014/0039663 A1* | 2/2014 | Boyer | B29C 67/0051 700/118 |

(Continued)

FOREIGN PATENT DOCUMENTS

CN 103640223 A 3/2014

*Primary Examiner* — Kidest Bahta
(74) *Attorney, Agent, or Firm* — Muncy, Geissler, Olds & Lowe, P.C.

(57) ABSTRACT

A 3D scanning-printing device includes a platform, a processor, a reflecting module, a projector and a 3D printing module. The platform carries an object. The processor is electrically connected with the platform, the reflecting module, the projector and the 3D printing module. The processor controls the reflecting module to move between a first position and a second position. When the reflecting module is located at the first position, the projector projects a structured light to the object so as to produce 3D spatial information. The processor receives the 3D spatial information and produces 3D printing information. When the reflecting module is located at the second position, the projector projects a cutting layer image according to the 3D printing information, and the reflecting module reflects the cutting layer image to the 3D printing module.

10 Claims, 4 Drawing Sheets

(56) References Cited

U.S. PATENT DOCUMENTS

| | | | |
|---|---|---|---|
| 2014/0070461 A1* | 3/2014 | Pax | B29C 67/0055 264/401 |
| 2014/0117575 A1* | 5/2014 | Kemperle | B29C 67/0055 264/40.7 |
| 2014/0271964 A1* | 9/2014 | Roberts, IV | B29C 67/0055 425/150 |

* cited by examiner

3D SCANNING-PRINTING DEVICE

CROSS REFERENCE TO RELATED APPLICATIONS

The non-provisional patent application claims priority to U.S. provisional patent application with Ser. No. 61/981,613 filed on Apr. 18, 2014. This and all other extrinsic materials discussed herein are incorporated by reference in their entirety.

BACKGROUND OF THE INVENTION

Field of Invention

The present invention relates to a 3D scanning-printing device and, in particular, to a 3D scanning-printing device having 3D scanning and 3D printing functions.

Related Art

As the development and application of 3D technology, the 3D scanning and 3D printing have become one the potential technologies. In the existing products, a 3D scanning device (e.g. a 3D scanner) is used to scan an object so as to produce the appearance information of the object, and then a 3D printing device is used to reproduce the object based on the appearance information.

However, the above approach needs to prepare a 3D scanning device and a 3D printing device, which has complex operation procedure and higher cost.

Therefore, it is an important subject to provide a 3D scanning-printing device which can provides both of the 3D scanning function and 3D printing function, thereby simplifying the operation procedure and decreasing the cost.

SUMMARY OF THE INVENTION

In view of the foregoing subject, an objective of the present invention is to provide a 3D scanning-printing device which can provides both of the 3D scanning function and 3D printing function, thereby simplifying the operation procedure and decreasing the cost.

To achieve the above objective, the present invention discloses a 3D scanning-printing device including a platform, a processor, a reflecting module, a projector and a 3D printing module. The platform is configured for carrying an object. The processor is electrically connected with the platform, the reflecting module, the projector and the 3D printing module. The processor controls the reflecting module to move between a first position and a second position. When the reflecting module is located at the first position, the projector projects a structured light to the object so as to produce 3D spatial information, and the processor receives the 3D spatial information and produces 3D printing information. When the reflecting module is located at the second position, the projector projects a cutting layer image according to the 3D printing information, and the reflecting module reflects the cutting layer image to the 3D printing module.

In one embodiment, the reflecting module comprises a plane mirror.

In one embodiment, the 3D scanning-printing device further includes an image retrieving unit for receiving the 3D spatial information and transmitting the 3D spatial information to the processor.

In one embodiment, the 3D printing module further includes a shaping chamber and a material disposed in the shaping chamber, and the reflecting module reflects the cutting layer image to the material.

In one embodiment, the 3D printing module further includes a motor, a thread rod and a shaping plate. The processor drives the motor to active the thread rod, and then the thread rod moves the shaping plate.

In one embodiment, the 3D spatial information comprises depth information of the object.

In one embodiment, the processor controls the platform to rotate within a plurality of specific angles.

In one embodiment, the D scanning-printing device further includes a track, and the reflecting module is disposed on the track to move between the first position and the second position.

In one embodiment, the image retrieving unit is a CCD camera.

In one embodiment, the material includes a light cured material.

As mentioned above, the 3D scanning-printing device of the invention uses a single projector and integrates the 3D scanning function and the 3D printing function within one device. In more detailed, when the 3D scanning-printing device performs a 3D scan, the reflecting module is located at the first position for reflecting the structured light projected from the project to the object, thereby producing the 3D spatial information related to the appearance of the object. Otherwise, when the 3D scanning-printing device performs a 3D print, the projector outputs the cutting layer image related to the appearance of the object, and the reflecting module located at the second position reflects the cutting layer image to the 3D printing module for performing the desired 3D print. Accordingly, this invention can use a single projector to integrate the 3D scanning function and the 3D printing function within one device. This feature can minimize the size of the entire device, decrease the cost and simplify the operation procedure.

BRIEF DESCRIPTION OF THE DRAWINGS

The present invention will become more fully understood from the subsequent detailed description and accompanying drawings, which are given by way of illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
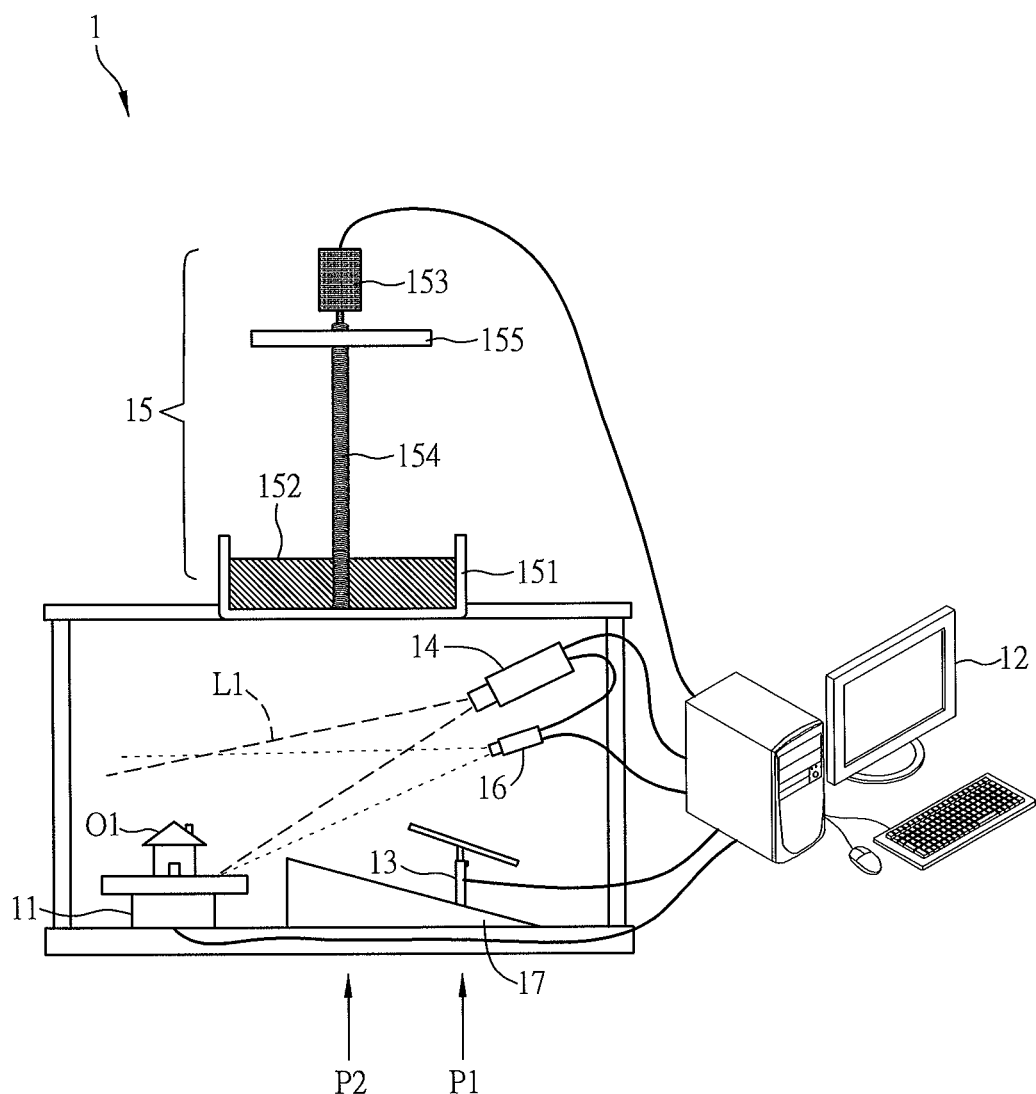
FIG. 1 is a schematic diagram showing a 3D scanning-printing device according to a preferred embodiment of the invention.

FIG. 1 is a schematic diagram showing a 3D scanning-printing device 1 according to a preferred embodiment of the invention. Referring to FIG. 1, the 3D scanning-printing device 1 includes a platform 11, a processor 12, a reflecting module 13, a projector 14 and a 3D printing module 15. The platform 11 is configured for carrying an object O1, which is a copy target by 3D scanning and 3D printing. Although the figure shows that the object O1 is a house model, this invention is not limited thereto. The processor 12 can be a computer or any terminal device with control and process functions. In this embodiment, the processor 12 is a desktop computer for example, and this invention is not limited thereto. The processor 12 can provide a user interface for the operator so as to control and setup all elements, modules or devices electrically connected with the processor 12. For example, the processor 12 can execute a 3D scanning-printing program so as to provide the user interface. The processor 12 is electrically connected with the platform 11, so that the processor 12 can control the rotation of the platform 11. The detailed description will be discussed hereinafter. In this embodiment, the reflecting module 13 is, for example, a plane mirror and is electrically connected with the processor 12. In some embodiments, the reflecting module 13 may further include a supporting member for supporting the plane mirror. The processor 12 controls the reflecting module 13 to move between a first position P1 and a second position P2. Of course, in some embodiments, the processor 12 can also control the tilt angle of the reflecting module 13, thereby increasing the operation flexibility and enlarging the reflecting range. The projector 14 is also electrically connected with the processor 12. The processor 12 controls the light projected by the projector 14 or the image content, which will be described hereinafter. The projection direction of the projector 14 is preferably in a direction toward the platform 11.

When the user intends to use the 3D scanning-printing device 1 to perform a 3D scan procedure on the object O1 so as to obtain the appearance information of the object O1, the user can operate the user interface of the processor to set the 3D scanning-printing device 1 to a scan mode. In more detailed, it is possible to setup the size of the object, printed amount, printing definition, or other related information. As the 3D scanning-printing device 1 is set in the scan mode, the processor 12 controls the reflecting module 13 at the first position P1 and controls the projector 14 to project a structured light L1. When the reflecting module 13 is located at the first position P1, the structured light L1 projected from the projector 14 is neither projected to the reflecting module 13 nor blocked by the reflecting module 13. Accordingly, the structured light L1 can be directly projected onto the object O1 on the platform 11. The structured light L1 can be, for example, a Gary code image, optical grating, or any image that can be decoded to provide depth information. When the structured light L1 is projected onto the object O1, the structured light L1 is changed with respect to the appearance of the object O1 so as to produce the 3D spatial information relating to the appearance of the object O1. In other words, the 3D spatial information can carry the depth information of the object O1. The processor 12 receives the 3D spatial information of the object O1 and then produces the 3D printing information with respect to the object O1. The detailed description of the 3D printing information will be discussed hereinafter.

Figure 2:
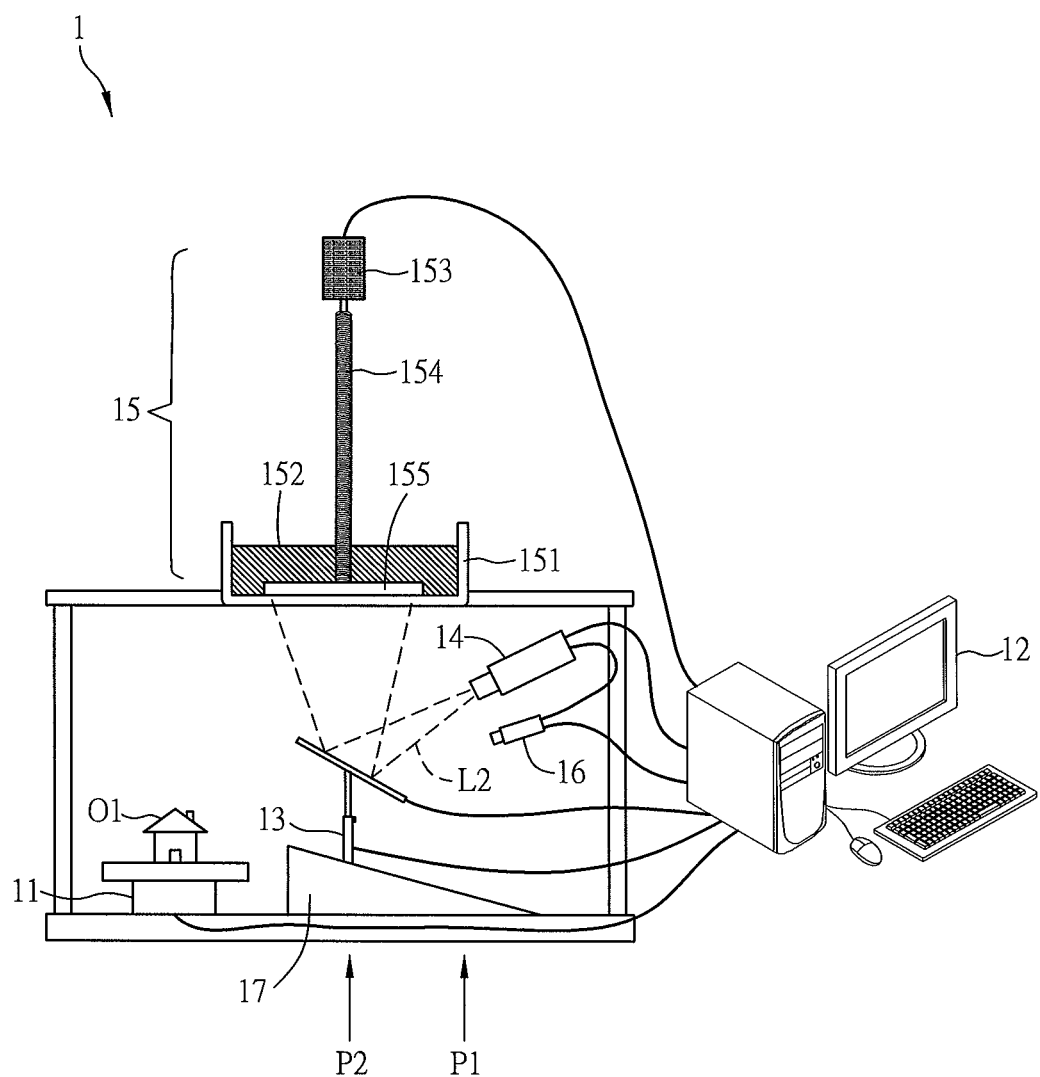
FIGS. 2, 3, and 4 are schematic diagrams showing the operation of the 3D scanning-printing device of FIG. 1.

FIG. 2 is a schematic diagram showing the operation of the 3D scanning-printing device of FIG. 1. As shown in FIG. 2, after the object O1 is scanned, the user can use the 3D scanning-printing device 1 to perform a 3D printing procedure. In more detailed, the user can operate the user interface of the processor 12 to set the 3D scanning-printing device 1 to a print mode. In more detailed, it is possible to setup the size of the printed object or other related information. As the 3D scanning-printing device 1 is set in the print mode, the projector 14 can project a cutting layer image L2 related to the object O1 in accordance with the 3D printing information of the object O1, and the processor 12 controls the reflecting module 13 to move to the second position P2. The reflecting module 13 located at the second position P2 can reflect the cutting layer image L2 to the 3D printing module 15 for performing the desired 3D printing procedure. The cutting layer image L2 will be further described hereinafter.

As mentioned above, the user can directly set and control the 3D scanning-printing device 1 through the processor 12 to perform the 3D scanning and 3D printing procedures. Moreover, by properly designed program, the user can simply key in or setup related parameters and then press the "start" button, and the desired 3D scan and 3D print can be completed. This can effectively simplify the operation procedure.

To be noted, the first position P1 and the second position P2 are not limited to the positions in the figure. In practice, any position of the reflecting module 13 that does not block the light projected from the projector 14 (e.g. the structured light L1 of FIG. 1) can be the first position p1. In addition, any position of the reflecting module 13 that can reflect the light projected from the projector 14 (e.g. the structured light L1 of FIG. 1) to the 3D printing module 15 can be the second position P2.

Referring to FIG. 1 again, the 3D scanning-printing device 1 further includes an image retrieving module 16. In this embodiment, the image retrieving module 16 is, for example, a CCD (charge-coupled device) camera. The image retrieving module 16 can receive the 3D spatial information as the structured light L1 is projected onto the object O1, and then transmit the 3D spatial information to the processor 12. The processor 12 then decodes the 3D spatial information so as to obtain the 3D printing information of the object O1 (the shot side). Unfortunately, the structured light L1 cannot be projected onto all surfaces of the object O1 at once. In order to retrieve the 3D printing information of all surfaces of the object O1, the platform 11 is electrically connected with the processor 12 and controlled to rotate within a plurality of specific angles. For example, if the initial angle of the platform 11 is at 0 degree, the processor 12 can control the platform 11 to rotate within 90, 180 and 270 degrees. When the platform 11 is rotated to one of the different angles, the projector 14 projects the structured light L1 once. Since the object O1 is relatively rotated with respect to the projector 14 as the platform 11 rotates, the projected structured lights L1 can be projected onto different surfaces of the object O1, thereby producing the 3D spatial information of different surfaces of the object O1. Then, the image retrieving module 16 receives the 3D spatial information and transmits it to the processor 12, and the processor 12 processes the received 3D spatial information of different angles by image-mosaicking algorithm, noise-filtering algorithm, 3D grid processing algorithm and/or 3D smoothing algorithm so as to obtain the complete 3D printing information (360 degrees) of the object O1. Of course, the processor 12 can control the platform 11 to rotate within four or more angles. When the platform 11 can rotate within more different angles, the obtained 3D printing information can more approach the actual appearance of the object O1. The above mentioned algorithms can be stored in a storage unit in the processor 12, and executed by the CPU in the processor 12.

Next, the processor 12 can perform a layer cutting procedure with respect to the 3D printing information in accordance with the set printing definition, thereby obtaining the desired cutting layer information. Herein, the printing definition specially indicates the printing definition in Z-axis (height). For example, if the height of the object O1 is 100 mm and the set printing definition is 0.1 mm, the processor 12 will cut the received 3D printing information into 1000 pieces so as to obtain 1000 cutting layer information. Each cutting layer information corresponds to the appearance information at a specific height of the object O1 ($z=0.1$ mm, mm, ..., and $z=100$ mm). As shown in FIG. 2, the projector 14 will project the corresponding cutting layer images L2 in sequence according to the cutting layer information, and then the reflecting module 13 reflects the cutting layer images L2 to the 3D printing module 15.

Figure 3:
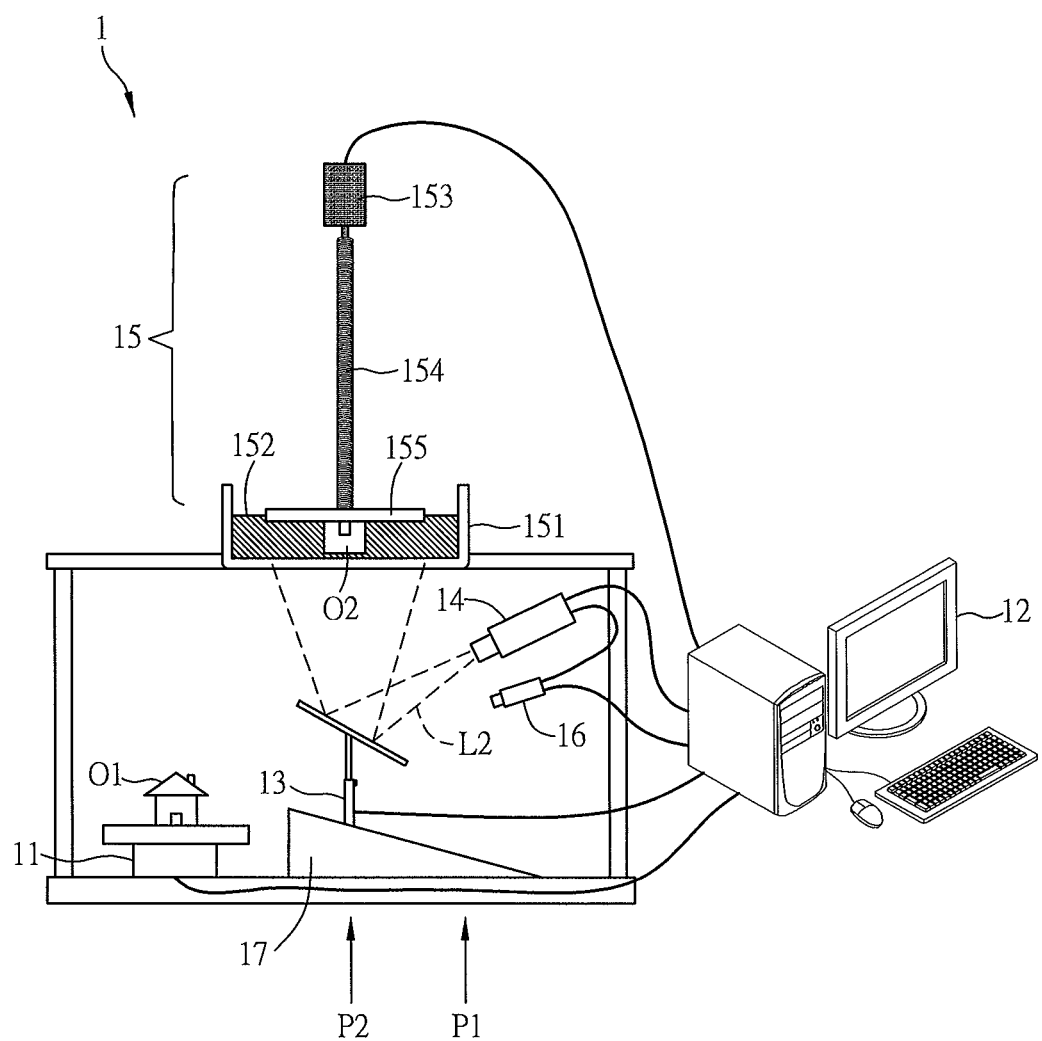
Figure 4:
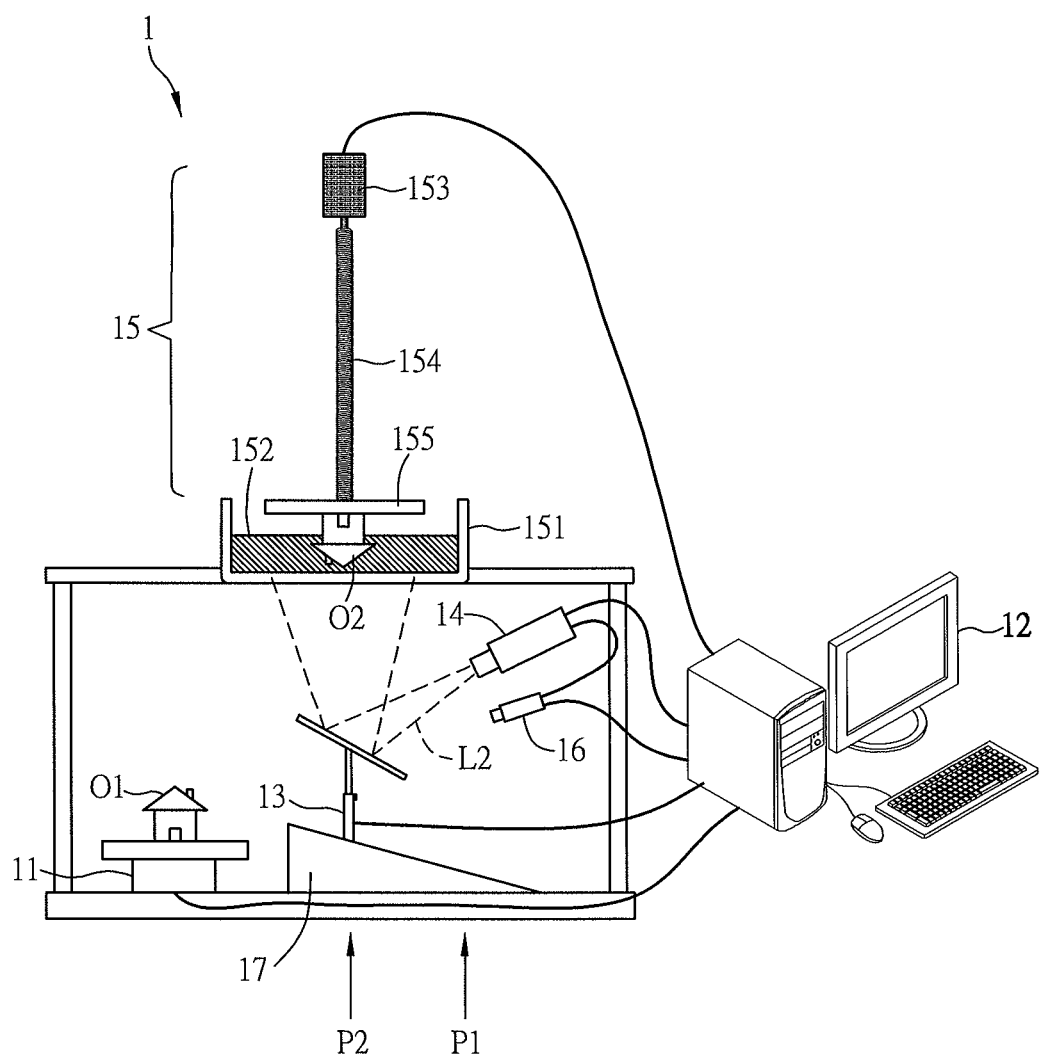

In this embodiment, the 3D printing module 15 further includes a shaping chamber 151 and a material 152 disposed within the shaping chamber 151. The material 152 may include a light cured material such as, for example but not limited to, a photosensitive resin. After being irradiated by a light of a specific wavelength, the material 152 will have chemical structure variation, so that the irradiated material 152 is solidified. Accordingly, the cutting layer image L2 can be a patterned light image containing a bright area and a dark area, and the bright area can be formed by the light source of specific wavelength capable of curing the material 152. In more detailed, when the cutting layer image L2 irradiates the material 152, the part of the material 152 irradiated by the bright area is cured while the other part of the material 152 irradiated by the dark area is not cured. FIGS. 3 and 4 are schematic diagrams showing the operation of the 3D scanning-printing device of FIG. 1. As mentioned above, when the cutting layer images L2 corresponding to the appearances of the different heights of the object O1 are reflected by the reflecting module 13 to the material 152 in sequence, the material 152 can gradually print the 3D printing copy O2 according to the cutting layer images L2 (see FIG. 3). With reference to FIG. 4, after all cutting layer images L2 are reflected to the material 152, the 3D printing copy O2 having an appearance similar to the object O1 can be produced.

Referring to FIGS. 2 to 4, the 3D printing module 15 of this embodiment further includes a motor 153, a thread rod 154 and a shaping plate 155. The processor 12 drives the motor 153 to active the thread rod 154, and then the thread rod 154 moves the shaping plate 155 up and down. The 3D printing copy O2 is formed on the shaping plate 155. In this embodiment, the moving of the shaping plate 155 is preferably corresponding to the change of the cutting layer images L2 and the printing definition set by the user. As mentioned above, when the size the printed 3D printing copy O2 is identical to the size of the object O1, the shaping plate 155 will move by 0.1 mm as changing to the next cutting layer image L2.

Referring to FIG. 1 again, the 3D scanning-printing device 1 of this embodiment may further include a track 17, and the reflecting module 13 is disposed on the track 17. The processor 12 controls the reflecting module 13 to move on the track 17 between the first position p1 and the second position P2.

In summary, the 3D scanning-printing device of the invention uses a single projector and integrates the 3D scanning function and the 3D printing function within one device. In more detailed, when the 3D scanning-printing device performs a 3D scan, the reflecting module is located at the first position for reflecting the structured light projected from the project to the object, thereby producing the 3D spatial information related to the appearance of the object. Otherwise, when the 3D scanning-printing device performs a 3D print, the projector outputs the cutting layer image related to the appearance of the object, and the reflecting module located at the second position reflects the cutting layer image to the 3D printing module for performing the desired 3D print. Accordingly, this invention can use a single projector to integrate the 3D scanning function and the 3D printing function within one device. This feature can minimize the size of the entire device, decrease the cost and simplify the operation procedure.

Although the present invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the present invention.

What is claimed is:

1. A 3D scanning-printing device, comprising:
   a platform for carrying an object;
   a processor electrically connected with the platform;
   an optical reflector electrically connected with the processor, wherein the processor controls the optical reflector to move between a first position and a second position;
   a projector electrically connected with the processor, wherein when the optical reflector is located at the first position, the projector projects a structured light to the object so as to produce 3D spatial information, and the processor receives the 3D spatial information and produces 3D printing information; and
   a 3D printer electrically connected with the processor, wherein when the optical reflector is located at the second position, the projector projects a cutting layer image according to the 3D printing information, and the optical reflector reflects the cutting layer image to the 3D printer, and the 3D printer prints a 3D printing copy based on the cutting layer image.

2. The 3D scanning-printing device of claim 1, wherein the optical reflector comprises a plane mirror.

3. The 3D scanning-printing device of claim 1, further comprising:
   an image camera receiving the 3D spatial information and transmitting the 3D spatial information to the processor.

4. The 3D scanning-printing device of claim 1, wherein the 3D printer further comprises a shaping chamber and a material disposed in the shaping chamber, and the optical reflector reflects the cutting layer image to the material.

5. The 3D scanning-printing device of claim 1, wherein the 3D printer further comprises a motor, a thread rod and a shaping plate, the processor drives the motor to active the thread rod, and then the thread rod moves the shaping plate.

6. The 3D scanning-printing device of claim 1, wherein the 3D spatial information comprises depth information of the object.

7. The 3D scanning-printing device of claim 1, wherein the processor controls the platform to rotate within a plurality of specific angles.

8. The 3D scanning-printing device of claim 1, further comprising:
   a track, wherein the optical reflector is disposed on the track to move between the first position and the second position.

9. The 3D scanning-printing device of claim 3, wherein the image camera is a CCD camera.

10. The 3D scanning-printing device of claim 4, wherein the material comprises a light cured material.

* * * * *